H. JOHNSON.
SURGICAL INSTRUMENT.
APPLICATION FILED FEB. 14, 1910.
979,505.
Patented Dec. 27, 1910.
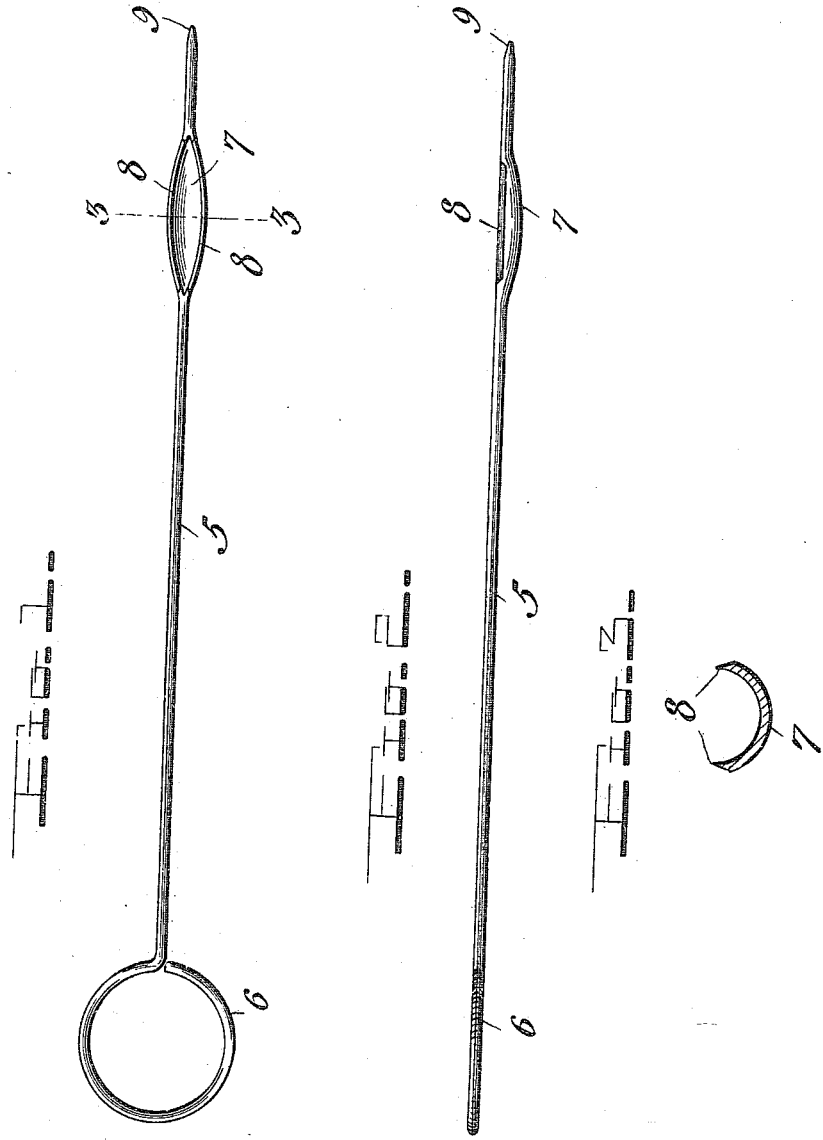
Witnesses
Chas. L. Griesbauer.
E. M. Ricketts
Inventor
H. Johnson,
By Watson E. Coleman,
Attorney

UNITED STATES PATENT OFFICE.

HENRY JOHNSON, OF WOODFORD, WISCONSIN.

SURGICAL INSTRUMENT.

979,505.　　　Specification of Letters Patent.　　Patented Dec. 27, 1910.

Application filed February 14, 1910.　Serial No. 543,667.

*To all whom it may concern:*

Be it known that I, HENRY JOHNSON, a citizen of the United States, residing at Woodford, in the county of Lafayette and State of Wisconsin, have invented certain new and useful Improvements in Surgical Instruments, of which the following is a specification, reference being had to the accompanying drawings.

This invention relates to certain new and useful improvements in surgical instruments for veterinary use and more particularly to an instrument of the above character for cutting growths from the interior of the udder or teats of milk bearing animals.

The principal object of the present invention is to provide an instrument which may be easily and quickly inserted into the teat or udder without danger of cutting the same and then rotated to cut the growth from the wall of the organ.

Another object is to provide an instrument of the above character which may be economically manufactured, and one which is highly efficient for the purposes in view.

With these and other objects in view, the invention consists of the novel features of construction, the combination and arrangement of parts fully described and claimed and illustrated in the accompanying drawings, in which—

Figure 1 is an elevation of a veterinary surgical instrument embodying my invention; Fig. 2 is an edge view thereof; and Fig. 3 is a section taken on the line 3—3 of Fig. 1.

Cows and other milk bearing animals are frequently affected with gatherings or growths upon the interior of their teats and udders which seriously interfere with the proper flow of the milk and in some instances entirely close the channel or passage and stop its flow altogether. Numerous instruments have been devised to remedy these conditions, but they have invariably been of such form as to render their use extremely dangerous to the animal, the teat being cut by the insertion of the instrument therein. These prior instruments have also been impracticable for the reason that they are very difficult to manipulate so as to remove the growth without cutting the wall of the organ after they have been inserted.

My improved instrument is devised with a view to eliminating these serious objections and provides a device which will not cut or scarify the udder upon the removal of the growth.

With the above ends in view I form the instrument from one continuous piece of metal preferably steel, to provide a shank or handle portion 5 formed upon its end with a finger ring 6 through which the operator's finger is adapted to be inserted in the use of the instrument. The shank is preferably cylindrical in form and adjacent to its other end is formed with a concavo-convex blade 7 which extends longitudinally and is equally disposed upon opposite sides of the shank 5. This blade is substantially elliptical in form the ends thereof gradually merging into the shank and it is provided with the knife edges 8. It will be noted that these cutting edges are disposed in line with the shank of the instrument. The outer extremity of the shank 5 is formed with a blunt point 9 which is adapted to be inserted into the orifice of the teat of the animal.

In the use of my improved instrument the point 9 is inserted into the end of the teat and the blade 7 forced therein the convex surface of the blade engaging with the wall of the orifice and holding the same away from the cutting edges of the blade. If the growth is in the udder of the animal additional pressure is brought to bear until the blade 7 is disposed therein and engaged with the growth. The operator may readily determine when the blade is properly positioned by the vibration of the handle portion 5 of the instrument when it engages with the protrusion on the udder wall. The instrument is then rotated and the cutting edges 8 of the blade will grind or cut the growth away from the organ. The concave blade also provides means for assisting in the removal of the growth after the same has been cut.

From the foregoing it is believed that the construction, operation and many advantages to be obtained by the use of my improved instrument will be apparent without necessitating a more extended description. It is simple, can be manufactured at a very low cost and is very efficient in use. All danger of cutting or tearing the teat or udder is eliminated and an instrument provided whereby the growth may be quickly removed with a minimum of pain to the animal.

Having thus described the invention what is claimed is:—

1. The herein described surgical instrument comprising a cylindrical shank forming a handle portion, a longitudinally extending concavo-convex cutting blade formed on the shank, the cutting edges of said blade being disposed in line with the shank, said edges converging at their ends and merging into the shank whereby a shallow trough is formed, the end of said shank adjacent to the blade being tapered to form a blunt point, substantially as and for the purpose set forth.

2. The herein described instrument comprising a cylindrical shank, a concavo-convex blade substantially elliptical in form, the edges of said blade being sharpened and gradually merging into the shank at their converging ends, said blade forming a shallow trough extending upon one side of the shank, said shank being disposed in the same plane beyond the opposite ends of the blade, one end of said shank being pointed, substantially as and for the purpose set forth.

In testimony whereof I hereunto affix my signature in the presence of two witnesses.

HENRY JOHNSON.

Witnesses:
 JOSIE SARGENT,
 R. E. GIERHART.